3,641,075
PRODUCTION OF ESTERS BY CATALYTIC CONVERSION OF α-ORGANOOXY HYDROPEROXIDES
Raymond L. Cobb, Bartlesville, Okla., assignor to Phillips Petroleum Company
No Drawing. Filed June 16, 1969, Ser. No. 833,795
Int. Cl. C07c 67/00, 73/06
U.S. Cl. 260—410                                      7 Claims

ABSTRACT OF THE DISCLOSURE

A process of producing an ester from an ozonized olefin by contacting the ozonized olefin with hydrogen in a liquid medium in the presence of Raney nickel-chromium catalyst.

---

This invention relates to a catalytic process for the production of esters.

In one of its more specific aspects, this invention relates to a process for the production of esters by catalytic conversion of an α-organooxy hydroperoxide such as an α-hydrocarbyloxy hydroperoxide and an α-alkyloxyalkyloxy hydroperoxide.

The preparation of α-hydrocarbyloxy hydroperoxides or α-alkyloxyalkyloxy hydroperoxides by contacting an olefin with ozone in the presence of a suitable alcohol or alkyloxy alkanol is known. It has now been discovered that such α-hydrocarbyloxy hydroperoxides or α-alkyloxyalkyloxy hydroperoxides can be converted into esters which are suitable as solvents and plasticizers.

This invention provides a method for such conversion. According to this invention, there is provided a process for the production of esters from α-hydrocarbyloxy hydroperoxides or α-alkyloxyalkyloxy hydroperoxides which comprises contacting the α-hydrocarbyloxy hydroperoxides or α-alkyloxyalkyloxy hydroperoxides contained in a diluent with hydrogen in the presence of a Raney nickel-chromium catalyst.

Accordingly, it is an object of this invention to provide a simple process for producing esters.

It is another object of this invention to provide a process for producing esters from a readily accessible catalyst.

The α-hydrocarbyloxy hydroperoxide or α-alkyloxyalkyloxy hydroperoxide which is employed in the process of this invention is conveniently produced by contacting a suitable olefin with ozone in the presence of an alcohol or alkyloxyalkanol under known reaction conditions. The resulting α-hydrocarbyloxy hydroperoxide or α-alkyloxyalkyloxy hydroperoxide can be hydrogenated either with or without separation from the diluent.

In addition to the α-hydrocarbyloxy hydroperoxide or α-alkyloxyalkyloxy hydroperoxide product from the ozonolysis, there is also produced an aldehyde in accordance with the reaction

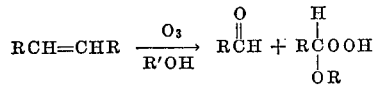

The aldehyde is produced in about the same molar quantity as is the hydroperoxide. The subsequent hydrogenation can be conducted either in the presence or the absence of the aldehyde. In the subsequent examples, the hydrogenations were conducted in the presence of the aldehyde with the amount of ester formed being compared with the amount of aldehyde present as a basis for determining the relative amounts of hydroperoxide converted.

A diluent is employed in the production of the ester. Preferably, the diluent will be a liquid hydrocarbon, an alcohol, or an ether. Suitable diluents include tetrahydrofuran, tetrahydropyran, hexane, cyclododecane, 2-propanol, butanol, ethanol, and the like. Any suitable quantity of diluent can be employed as the reaction medium. In general, quantities of diluent comprising in the range of 5–95 weight percent of the reaction mixture can be employed.

The hydroperoxide contained in the diluent is contacted with from about one to about twenty moles of hydrogen per mole of hydroperoxide. Contact is made at a temperature in the range of about −10 to about 70° C., preferably from about 15 to about 50° C., under pressures up to about 100 atmospheres. Suitable contact or reaction times range from about 10 minutes to about 40 hours.

The catalyst which is employed is a Raney nickel-chromium catalyst, this catalyst being commercially available from W. R. Grace Company, Raney Catalyst Division. It is designated as Grade 24, active chromium promoted nickel catalyst, and has a nickel content of about 73 weight percent and a chromium content of about 2.0 percent. However, any nickel-chromium catalyst having a chromium content of from 1 to about 5 percent is satisfactory.

The quantity of catalyst employed influences the aforementioned reaction time. Generally, an amount of catalyst in the range of about 0.01 to about 200 volume percent of the hydroperoxide will be satisfactory, with from about 1 to about 25 volume percent being preferably employed.

The general nature of the reaction is represented by the following expression

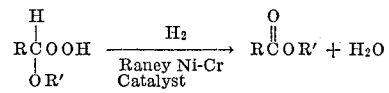

and the method of this invention is applicable to the range in which R is an alkyl group having from 1 to about 20 carbon atoms inclusive, and R' is alkyl, cycloalkyl, alkoxyalkyl, aralkyl, cycloalkylalkyl, or alkylcycloalkyl in which R' contains from 1 to about 10 carbon atoms, inclusive.

Some examples of α-hydrocarbyloxy hydroperoxides or α-alkyloxyalkyloxy hydroperoxides which can be employed according to the process of this invention include α-(2-propyloxy)heptyl hydroperoxide,
α-(methyloxy)heptyl hydroperoxide,
α-(3-cyclohexylbutyloxy)heneicosyl hydroperoxide,
α-(methyloxy)ethyl hydroperoxide,
α-(1-decyloxy)heneicosyl hydroperoxide,
α-(cyclodecyloxy)heneicosyl hydroperoxide,
α-(cyclopentyloxy)hexyl hydroperoxide,
α-(methyloxymethyloxy)hexyl hydroperoxide,
α-(8-ethyloxyoctyloxy)-2-ethyloctyl hydroperoxide,
α-(3-ethylcyclohexyl)propyl hydroperoxide,
α-(benzyloxy)butyl hydroperoxide,
α-[2-methyl-4-(2-methylpropyloxy)butyloxy]decyl hydroperoxide, and the like.

Examples of esters which can be produced according to the process of this invention include 2-propyl heptanoate, methyl heptanoate, 3-cyclohexylbutyl heneicosanoate, methyl acetate, 1-decyl heneicosanoate, cyclodecyl heneicosanoate, cyclopentyl hexanoate, methyloxymethyl hexanoate, 8 - ethyloxyoctyl 2 - ethyloctanoate, 3-ethylcyclohexyl propanoate, benzyl butanoate, 2 - methyl - 4- (2-methylpropyloxy)butyl decanoate, and the like.

The following illustrate the processing of an oxonolysis product of an olefin, the α-hydrocarbyloxy hydroperoxide, α-(2 - propyloxy)heptyl hydroperoxide, having been prepared by ozonolysis of 7-tetradecene in 2-propanol. The original concentration of the 7-tetradecene was 40 parts by weight in 160 parts by weight of the 2-propanol.

In one instance, to 20 ml. of the resulting α-hydrocarbyloxy-containing ozonolysis product, including the aldehyde, was added 0.25 g. of Raney nickel-chromium catalyst and 2 ml. of pyridine. Hydrogen was introduced into the reaction mixture for 2 hours, the mixture being maintained at about 20° C. and about 4 atmospheres pressure. The product, on analysis, showed the presence of both the ester and aldehyde in a mol ratio of about 1.1 to 1. Thus, essentially complete conversion of the α-hydrocarbyloxy hydroperoxide to the ester was effected.

In a comparative instance, a 20 ml. sample of the α-hydrocarbyloxy hydroperoxide-containing ozonolysis product, prepared as described above and including the aldehyde, was added to a mixture containing 2 ml. of pyridine and 0.25 g. of Raney nickel catalyst. Hydrogen was passed through the mixture at 20° C. and 4 atmospheres for 1 hour. Analysis indicated a product of a mixture of ester and aldehyde in a mol ratio of only 0.16 to 1. Hence, when using the Raney nickel catalyst, considerably less α-hydrocarbyloxy hydroperoxide was converted to ester than when using the Raney nickel-chromium catalyst.

It is seen from these data that the Raney nickel-chromium catalyst of this invention produces esters upon hydrogenation of a α-hydrocarbyloxy hydroperoxide and produces yields superior to those of Raney nickel catalyst based upon comparisons between the proportion of esters to aldehydes in the final product.

It will be evident from the above that various modifications can be made to this invention. For example, it is possible to carry out these reactions employing hydroperoxides produced by other processes and to employ the process with, or without, the separation of the hydroperoxides. However, such are considered as being within the scope of the invention.

What is claimed is:

1. A process for the production of an ester which comprises contacting an α-organooxy hydroperoxide selected from the group consisting of α-hydrocarbyloxy hydroperoxides and an alkyloxyalkyloxy hydroperoxide with hydrogen and a Raney nickel-chromium catalyst in a liquid reaction medium under ester-forming reaction conditions.

2. The process defined in claim 1 in which the temperature is maintained in the range from about −10 to about 70° C. at a pressure up to about 100 atmospheres.

3. The process defined in claim 1 in which the catalyst is present in an amount from about 0.01 to about 200 volume percent of the α-organooxy hydroperoxide.

4. The process defined in claim 1 in which the α-organooxy hydroperoxide has the general formula RCHOR'OOH in which R is an alkyl radical having from 1 to about 20 carbon atoms and R' is selected from the group consisting of alkyl, cycloalkyl, alkoxyalkyl, aralkyl, cycloalkylalkyl, and alkylcycloalkyl, wherein R' has from 1 to about 10 carbon atoms.

5. The process defined in claim 1 in which the liquid reaction medium is an organic diluent selected from the group consisting of tetrahydrofuran, tetrahydropyran, hexane, cyclodecane, 2-propanol, butanol and ethanol.

6. The process as defined in claim 1 in which the α-organooxy hydroperoxide is contacted with from about 1 to about 20 mols of hydrogen per mol of hydroperoxide.

7. The process as defined in claim 1 in which an α-organooxy hydroperoxide is contacted with about 1 to about 20 mols of hydrogen per mol of hydroperoxide in a liquid organic diluent in the presence of a Raney nickel-chromium catalyst in the concentration of from about 0.01 to about 200 volume percent of the hydroperoxide at a temperature from about −10 to about 70° C. at a pressure up to about 100 atmospheres.

References Cited

UNITED STATES PATENTS 3,287,383  11/1966  Perry _____ 260—410.9

LEWIS GOTTS, Primary Examiner

D. G. RIVERS, Assistant Examiner

U.S. Cl. X.R.

260—410.5, 410.6, 410.9 R, 496, 610 R